Patented July 10, 1934

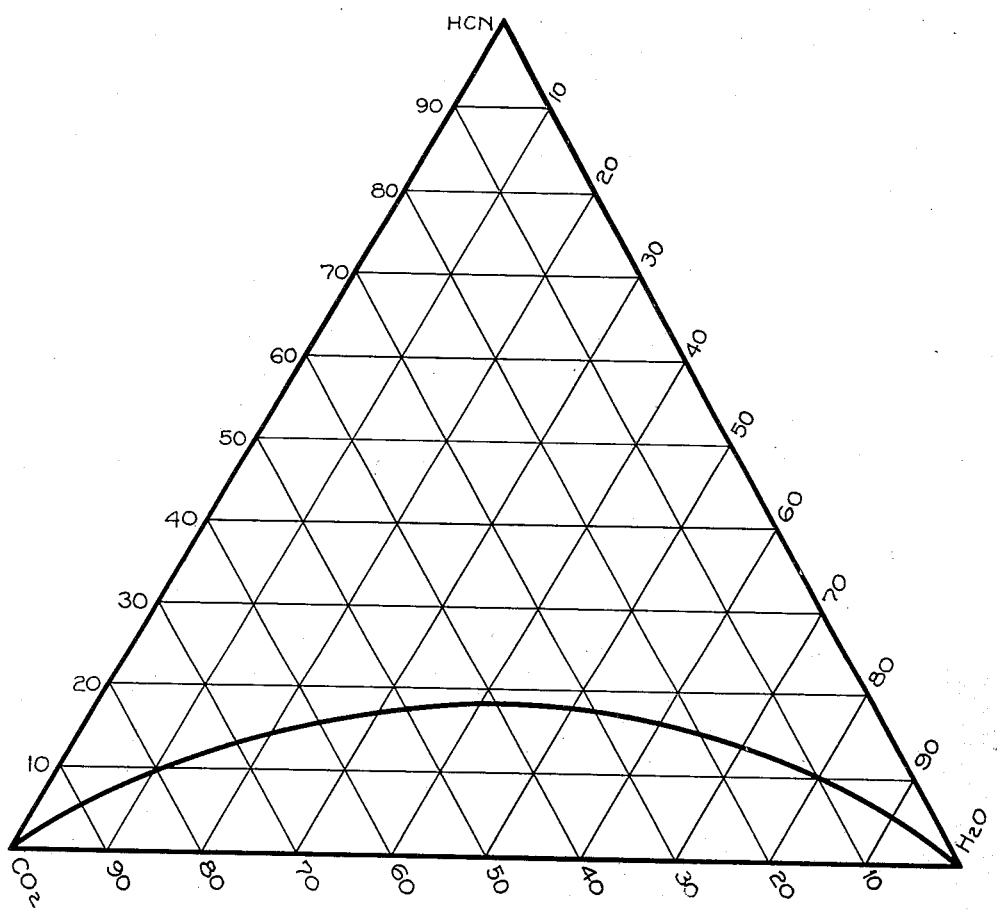

1,966,253

UNITED STATES PATENT OFFICE 1,966,253

MANUFACTURE OF CYANIDES

Alexander Douglas Macallum, Niagara Falls, N. Y., assignor to E. I. du Pont de Nemours & Company, Inc., Wilmington, Del., a corporation of Delaware Application August 8, 1933, Serial No. 684,231

14 Claims. (Cl. 23—79)

This invention relates to the manufacture of alkali metal and alkaline earth metal cyanides and more particularly to the manufacture of such cyanides by the reaction of hydrocyanic acid or its equivalent with the corresponding anhydrous carbonate.

One method of preparing an alkali metal cyanide comprises reacting hydrocyanic acid with an aqueous alkaline solution, for example, alkali metal hydroxide solution. However, the cyanide solution thus obtained is somewhat difficult to evaporate to dryness without decomposition and discoloration of the cyanide and the evaporation process adds to the cost of the product. Furthermore, because of their extreme tendency to hydrolyze, the alkaline earth metal cyanides cannot be prepared by this method. Hence various investigators have sought means for producing alkali metal and alkaline earth metal cyanides under anhydrous conditions. One proposed method comprises contacting hydrocyanic acid or its equivalent, for example, ammonium cyanide or formamide, with anhydrous alkali metal carbonate at temperatures below the melting point of the carbonate or the eutectic mixture of the corresponding cyanide and the carbonate. Various methods of carrying out this reaction have been proposed with the object of producing cyanides of high purity. However, in order to produce an alkali metal cyanide containing 96% or more of cyanide, it has heretofore been necessary to contact the carbonate with a large excess of hydrocyanic acid or equivalent gas with the result that considerable amounts of hydrocyanic acid pass through the reaction chamber unreacted. No process has been devised which effects substantially complete reaction of the hydrocyanic acid with alkali metal or alkaline earth metal carbonate to produce a cyanide of high purity.

An object of this invention is to devise an improved process for the manufacture of alkali metal and alkaline earth metal cyanides by reacting hydrocyanic acid or its equivalent with the corresponding anhydrous carbonate. A further object is to provide such a process wherein substantially all of the hydrocyanic acid is utilized. Further objects will be apparent from the following description of my invention.

The above objects are attained in accordance with my invention by passing hydrocyanic acid or its equivalent in contact with an alkali metal carbonate at elevated temperatures, removing either water vapor or carbon dioxide, or both, from the resulting off-gas and contacting the residual gas with the carbonate.

As mentioned above, an alkali metal carbonate may be reacted either with hydrocyanic acid or its equivalent, for example, ammonium cyanide or formamide, to produce the corresponding cyanide, water and carbon dioxide. The chemistry involved in these reactions may be represented by the following equations:

(1) $2HCN + Na_2CO_3 = 2NaCN + H_2O + CO_2$
(2) $2HCONH_2 + Na_2CO_3 = 2NaCN + 3H_2O + CO_2$
(3) $2NH_4CN + Na_2CO_3 = 2NaCN + H_2O + CO_2 + NH_3$

In addition to the above reactions, ordinarily some side reactions occur which result in the formation of ammonia. This formation of ammonia is probably chiefly due to the decomposition of hydrocyanic acid. In the reaction represented by Equation (2) some ammonia also may be formed by the partial decomposition of the formamide according to the following equation:

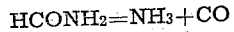

As illustrated by the above equations, the off-gas resulting from the reaction of excess HCN or its equivalent with a carbonate contains water vapor and carbon dioxide, together with more or less ammonia. When the formamide is used, it probably first is dehydrated to form hydrocyanic acid and water vapor and the hydrocyanic acid thus released reacts with the carbonate in accordance with Equation (1) above.

I have discovered that the presence of the water vapor and carbon dioxide in the gases tends to inhibit the reaction of hydrocyanic acid with carbonate beyond a certain point so that all of the HCN cannot be reacted and further only a definite limited NaCN concentration is obtained. From the results of my investigations, it appears that this action of the water vapor and carbon dioxide may be due to the equilibrium set up between the carbonate-cyanide mixture and the mixture of HCN, $H_2O$ and $CO_2$. The appended drawing diagrammatically illustrates the equilibrium between a mixture of water vapor, carbon dioxide and hydrocyanic acid and a solid mixture consisting of 96% by weight of sodium cyanide and 4% by weight of anhydrous sodium carbonate, at a temperature of 425–450° C. The figures on the diagram show percent by volume. The curve in the diagram passes through the approximate points of equilibrium which I have determined. It will be seen from this equilibrium curve that when water vapor and carbon dioxide are present in approximately equal concentrations by volume, the HCN content of the gas mixture in equilibrium with the 96% cyanide—4% of carbonate mixture, will be approximately 18% by volume. Hence, if hydrocyanic acid is passed through anhydrous sodium carbonate and the gases recirculated until equilibrium is reached with a 96% cyanide mixture, the gases will still contain 18% of unreacted HCN and further recirculation will not remove this residual HCN to any substantial extent. However, if the concentration of either water or $CO_2$ is reduced to around 10% per volume, the equilibrium mixture will contain only 10% of HCN. As the concentration of either water or $CO_2$ is further decreased, the concentration of HCN in the equilibrium mixture approaches zero as a limiting value. In other words, if either the water vapor or $CO_2$ is substantially completely removed from the mixture, the result will be substantially complete reaction of HCN with the carbonate to produce a 96% cyanide-carbonate mixture. This reaction of course requires in addition that the temperature and physical condition of the carbonate and the resulting mixture are favorable.

I have further discovered that the water or carbon dioxide tends to react with alkali metal cyanide at the reaction temperature, causing hydrolysis and/or oxidation, thus decreasing the yield of the cyanide. Hence the removal of carbon dioxide and/or water vapor further increases the yield by preventing these side reactions.

One method of carrying out my invention will be described with reference to the reaction of anhydrous hydrocyanic acid vapor with an anhydrous alkali metal carbonate. The finely divided carbonate is heated to a temperature of 200–500° C. in a suitable reaction chamber and the hydrocyanic acid vapor is passed through the chamber, preferably with some agitation of the solid. The off-gases issuing from the chamber are treated to remove therefrom all or part of either carbon dioxide, water or both and the residual gas is then recirculated through the reaction chamber with the addition of more hydrocyanic acid vapor as required. I prefer to remove only water vapor from the off-gases since it is relatively difficult to remove carbon dioxide without at the same time removing part of the HCN. However, I may also remove the carbon dioxide or both the carbon dioxide and water vapor. For example, if it is desired to utilize part of the HCN in the off-gas to produce calcium cyanide, I may pass the off-gas through lime water or in contact with anhydrous calcium hydroxide or calcium oxide, by which procedure carbon dioxide is removed from the off-gases and calcium cyanide is formed by reaction with part of the HCN. The gas, thus freed from carbon dioxide, may then be recirculated over alkali metal carbonate or a carbonate-cyanide mixture to react the residual HCN.

It is preferable also to remove ammonia from the off-gases, especially if it is present in large quantities, in order to prevent undue accumulation of ammonia in the reaction system during an extended period of recirculation. The recovered ammonia may also be of economical significance as a by-product.

My invention may be further illustrated by the following example showing the reaction of formamide with a carbonate.

Example

Formamide vapor, diluted with nitrogen, was passed through a layer of finely divided anhydrous sodium carbonate at a temperature of about 415 to 435° C. During a period of 62 minutes, 9.65 grams of formamide vapor and about 500 c. c. of nitrogen (measured at room temperature and atmospheric pressure) were passed through the apparatus. The off-gases leaving the reaction chamber were passed first through a dilute solution of sulfuric acid which served to remove ammonia and thence through a tube containing anhydrous calcium chloride which removed substantialy all of the water vapor. The off-gas from the calcium chloride tube, which consisted mainly of hydrocyanic acid and nitrogen together with a small amount of carbon dioxide, was then passed through a second reaction chamber containing finely divided sodium carbonate maintained at a temperature of 445 to 455° C. The off-gases from the second reaction chamber were passed through a sodium hydroxide solution to absorb any residual hydrocyanic acid. It was found that 98.3% of the hydrocyanic acid formed by the dehydration of the formamide in the first reaction chamber had reacted with the carbonate in the two reaction chambers.

Various modifications of my invention may be made without departing from the spirit and scope thereof. The off-gases from the reaction vessel after removal of water and/or $CO_2$ may be recirculated back through the same reaction charge or may be passed on to a second reaction vessel containing the carbonate. If desired, a plurality of reaction vessels may be used in series, for example, two, three or more reaction vessels, each charged with carbonate. The gases are passed through the entire series of reaction vessels, carbon dioxide, water vapor or both being removed prior to the introduction of the gas into each succeeding reaction vessel. Such an arrangement may utilize the counter-current principle, that is, when the carbonate in the first reaction vessel has been converted to cyanide of the desired strength, the HCN or formamide is then led directly into the second reaction vessel while the off-gases from the last reaction vessel after dehydration are passed into a fresh charge of carbonate.

I claim:

1. A process for preparing cyanide comprising reacting a cyanide forming gas with an alkali meal carbonate at an elevated temperature, treating the resulting gas mixture to remove at least one of the gaseous by-products comprising water vapor and carbon dioxide and passing the residual gas in contact with said carbonate at an elevated temperature.

2. A process for preparing cyanide comprising reacting a cyanide forming gas with an alkali metal carbonate at an elevated temperature, treating the resulting gas mixture to remove water vapor and passing the residual gas in contact with said carbonate at an elevated temperature.

3. A process for preparing cyanide comprising reacting hydrocyanic acid with an alkaline metal carbonate at an elevated temperature, treating the resulting gas mixture to remove at least one of the gaseous by-products of the group comprising water vapor and carbon dioxide and passing the residual gas in contact with said carbonate at an elevated temperature.

4. A process for preparing cyanide comprising passing a stream of hydrocyanic acid vapor in contact with an alkali metal carbonate at an elevated temperature, treating the resulting off-gas to remove water vapor and passing the residual gas in contact with said carbonate at an elevated temperature.

5. A process for preparing cyanide comprising passing a stream of hydrocyanic acid vapor in contact with sodium carbonate at 200–500° C., treating the resulting off-gas to remove at least one of the gaseous by-products of the group comprising water vapor and carbon dioxide and passing the residual gas in contact with said carbonate at the aforesaid temperature.

6. A process for preparing cyanide comprising passing a stream of hydrocyanic acid vapor in contact with sodium carbonate at 200–500° C., treating the resulting off-gas to remove water vapor and passing the residual gas in contact with said carbonate at the aforesaid temperature.

7. A process for preparing cyanide comprising passing a stream of hydrocyanic acid vapor in contact with sodium carbonate at 200–500° C., treating the resulting off-gas to remove water vapor and ammonia and passing the residual gas in contact with said carbonate at the aforesaid temperature.

8. A process for preparing cyanide comprising passing a stream of hydrocyanic acid vapor in contact with sodium carbonate at 200–500° C., treating the resulting off-gas to remove water vapor and ammonia and passing the residual gas in contact with a fresh quantity of said carbonate at the aforesaid temperature.

9. A process for preparing cyanide comprising passing a stream of hydrocyanic acid vapor in contact with an alkali metal carbonate at an elevated temperature, treating the resulting off-gas to remove carbon dioxide and passing the residual gas in contact with said carbonate at an elevated temperature.

10. A process for preparing cyanide comprising passing a stream of hydrocyanic acid vapor in contact with sodium carbonate at 200–500° C., treating the resulting off-gas to remove carbon dioxide and passing the residual gas in contact with said carbonate at the aforesaid temperature.

11. A process for preparing cyanide comprising reacting formamide vapor with an alkali metal carbonate at an elevated temperature, treating the resulting gas mixture to remove at least one of the gaseous by-products of the group comprising water vapor and carbon dioxide and passing the residual gas in contact with said carbonate at an elevated temperature.

12. A process for preparing cyanide comprising passing a stream of formamide vapor in contact with an alkali metal carbonate at an elevated temperature, treating the resulting off-gas to remove water vapor and passing the residual gas in contact with said carbonate at an elevated temperature.

13. A process for preparing cyanide comprising passing a stream of formamide vapor in contact with sodium carbonate at 200–500° C., treating the resulting off-gas to remove water vapor and ammonia and recirculating the residual gas over said carbonate at the aforesaid temperature.

14. A process for preparing cyanide comprising passing a stream of formamide vapor in contact with sodium carbonate at 200–500° C., treating the resulting off-gas to remove water vapor and ammonia and passing the residual gas in contact with a fresh quantity of said carbonate at the aforesaid temperature.

ALEXANDER DOUGLAS MACALLUM.